June 15, 1948. H. W. LAND 2,443,565
LAND SAIL VEHICLE

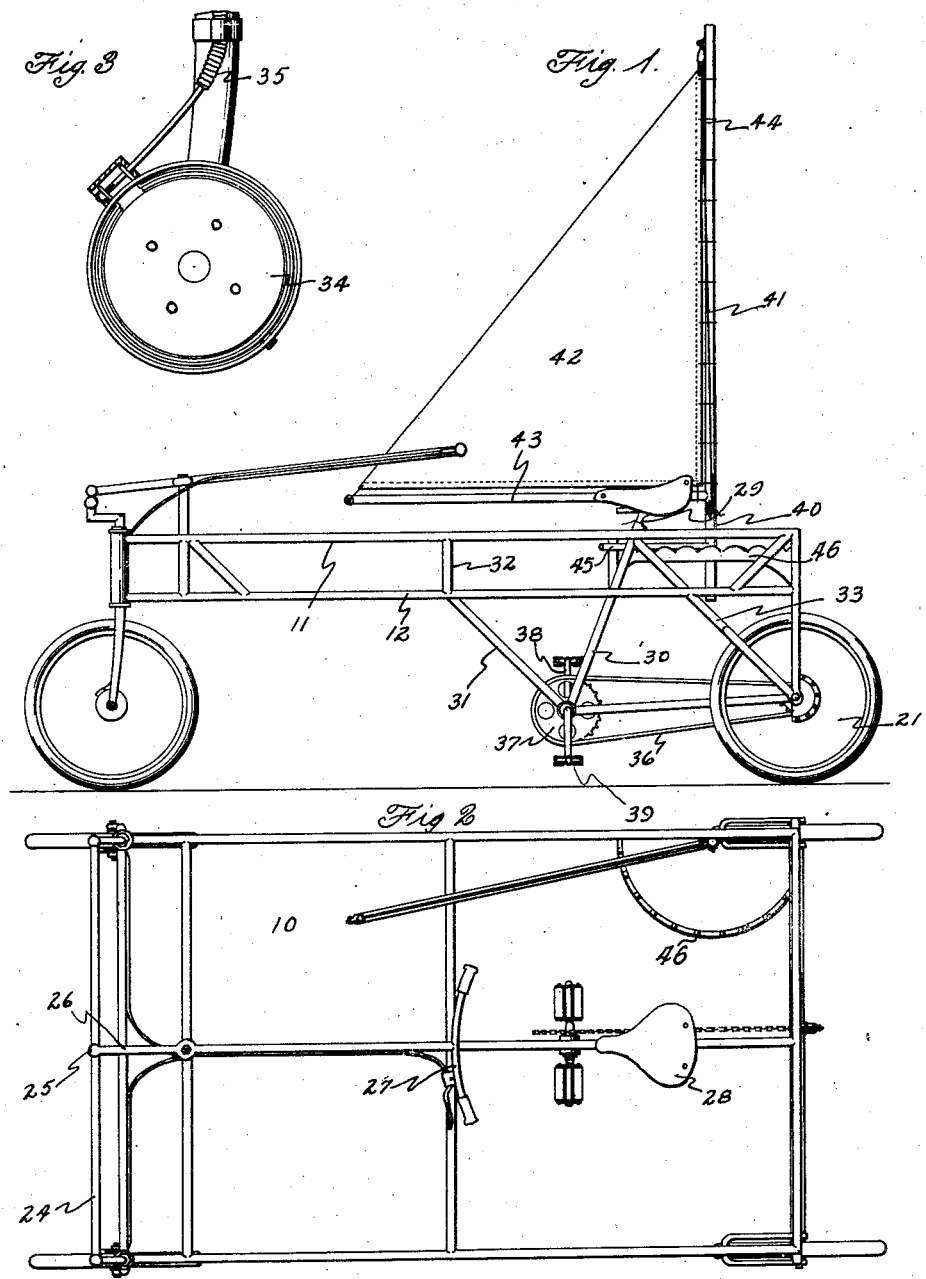

Filed Dec. 6, 1945 2 Sheets-Sheet 2

INVENTOR.
Hal W. Land

BY *Victor J. Evans & Co.*
ATTORNEYS

Patented June 15, 1948

2,443,565

UNITED STATES PATENT OFFICE 2,443,565

LAND SAIL VEHICLE

Hal W. Land, Louisville, Ky.

Application December 6, 1945, Serial No. 633,236

2 Claims. (Cl. 280—213)

The invention relates to a land vehicle of the bicycle type, and more especially to a land sail vehicle.

The primary object of the invention is the provision of a vehicle of this character, wherein it is equipped with a wind sail, similar to a sail boat, and also can be propelled through pedal action, similar to a bicycle, the vehicle being of novel construction and is unique in the assembly thereof.

Another object of the invention is the provision of a vehicle of this character, wherein the construction thereof permits its use for commercial purposes, advertising, sports, and transportation, the vehicle being adapted to be driven by wind or manually, and is designed for use on flat land when operating as a sail vehicle, but in hill climbing it can be manually propelled.

A further object of the invention is the provision of a vehicle of this character, which is simple in construction, thoroughly reliable and efficient in operation, strong, durable, neat in appearance, comfortable in riding qualities, readily and easily handled, and inexpensive to manufacture.

With these and other objects in view the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a side view of the vehicle constructed in accordance with the invention.

Figure 2 is a top plan view thereof.

Figure 3 is a detail fragmentary view showing the brake for the vehicle.

Similar reference characters indicate corresponding parts throughout the several views in the drawings.

Figure 4:
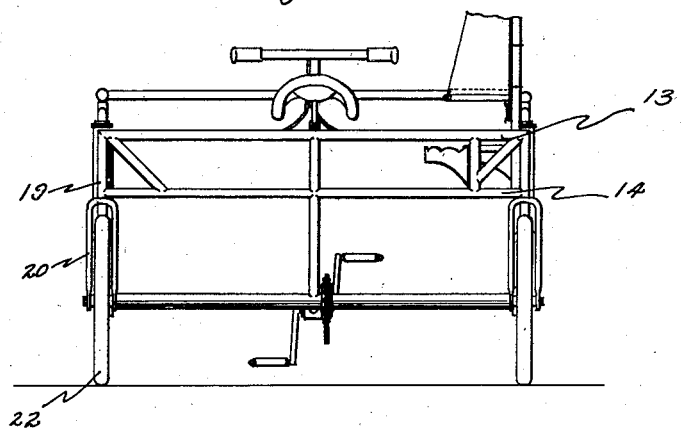
Figure 4 is a rear elevation of the vehicle.
Figure 5:
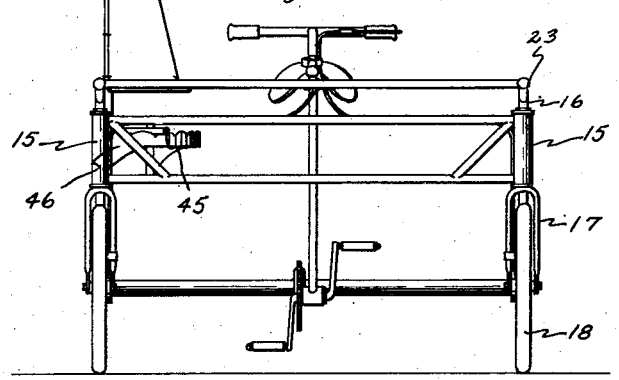
Figure 5 is a front view thereof.
Figure 6:
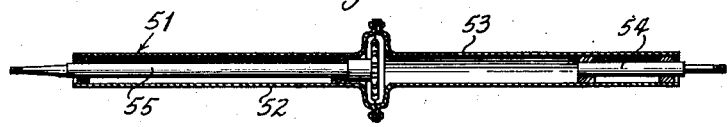
Figure 6 is a longitudinal sectional view of a rear axle structure forming a part of the invention.

Referring to the drawings in detail, the vehicle constructed in accordance with the invention, comprises a chassis involving a body frame 10 which in this instance is of substantially rectangular shape, yet it may be of any other selected configuration, having upper and lower spaced parallel side rails 11 and 12, respectively, and upper and lower spaced parallel front and rear cross end rails 13 and 14, respectively, preferably made from tubing, while at the forward corners where the upper and lower side and end rails approach one another there is provided steering post columns 15.

Within the columns 15 are fitted steering posts 16, of the front wheel turning forks 17 carrying the front wheels 18, preferably rubber tired. At the rear corners of the frame 10 where the side and end rails approach each other are the fittings 19 of rear wheel forks 20 carrying rear wheels 21, preferably rubber tired, the tires being denoted generally at 22 for the front and rear wheels. The steering posts 16 are equipped with turning cranks 23 at their upper ends above the frame 10, and connecting these cranks 23 is a cross-tied rod 24 having a midway coupling 25 with a steering arm or lever 26 provided with a handle bar 27 arranged close to a saddle 28 for a rider of the vehicle.

The saddle 28, its supporting stem 29, adjustably fitted in a center seat column 30 of a bicycle-like frame 31, which is built with the frame 10 at the longitudinal center thereof, is next to the rear end of the same. The frame 10 is strengthened or reinforced with braces 32, and forked supports 33 for the rear wheels 21.

Both of the steering wheels 18 is equipped with a braking device 34, which is controlled by hand operated actuator 35 extended to the handle bar 27 within easy reach of the user of the vehicle for braking purposes thereof.

The left rear wheel 21 is powered from chain and sprocket connections 36 and 37, respectively, and including the pedal cranks 38 and pedals 39, as is common in bicycles or the like, and foot operated. The right rear wheel is free.

The frame 10 at one side thereof, preferably near the rear right hand corner thereof in the advancing direction of the vehicle, has built therewith a sail mast socket fitting 40 in which is detachably engaged the mast 41 for a sail 42, having the usual boom 43, the sail 42 being raised and lowered in any suitable manner, preferably by a hand operated raising and lowering rigging 44. The boom 43 is swingable by a throw lever 45 adapted to be latched selectively in a keeper segment or arcuate rack 46 stationarily held at the rear right hand corner of the frame 10, so that the sail 42 can be regulated windwise by the rider of the vehicle when the latter is to be driven by such sail. The sail and its adjuncts can be conveniently removed from the vehicle if so desired, and the latter pedaled similarly to an ordinary bicycle or the like for the driving of such vehicle.

The frame 10 is a broad gauge formation to assure stability of the vehicle when travelling by sailing, as should be apparent, so that there is no liability of the said vehicle turning over in this connection.

The frame 10 has a rear axle structure 51 comprising two hollow tubes 52 and 53. In the tube 53 there is connected a stub shaft 54 adapted to receive the forked support 33 and the right rear wheel. In the hollow tube part 52, there is extended a drive shaft 55 adapted to extend into driving relation with the left rear wheel and through the forked support at that side of the frame. The shaft 53 at its inner end has a sprocket adapted to be driven by chain 36 on the bicycle-like frame.

What is claimed is:

1. A land vehicle comprising a four cornered frame, front wheels dirigibly connected to the forward corners of the frame, a tubular structure connected to the rear of the frame to extend transversely thereof at the rear corners, forked supports extending downwardly from the rear of the frame, a stub shaft in the tube and extending laterally through one of the forked supports to contain one of the rear wheels within the forked support, a drive shaft extending from the center of the tube in the opposite direction from the stub shaft and extending through the forked support at the opposite side of the frame to contain the opposite rear weel and to drive the same, and a bicycle-like frame having a seat thereon extending longitudinally through the center of the first-mentioned frame, and having a pedal device in alignment with the seat, a chain and sprocket connection between the pedal device and the shaft within the tube extending to the drive wheel, and steering mechanism pivoted on the bicycle-like frame and connect to the dirigible wheels to steer the vehicle, said steering mechanism extending rearwardly for hand operation into close proximity to the seat.

2. A wind-operated vehicle comprising a rectangular shaped frame having four corners, a bicycle-like frame extending longitudinally through the center of the first-mentioned frame, front wheels dirigibly connected to the forward corners of the first-mentioned frame and steering mechanism extending rearwardly therefrom over the bicycle-like frame, rear wheels connected to the rear corners of the rear frame, said bicycle-like frame having an operator's station thereon adjacent the rear of the same, a pedal mechanism including a rearwardly extending chain and a laterally extending shaft connected with one of the rear wheels, a stub shaft on the rear frame for connecting the opposite rear wheel to the frame, said first-mentioned frame having a socket fitting at the rear corner thereof to which the rear wheel is connected to the frame by means of the stub shaft, a sail mast projected downwardly into said socket fitting whereby the weight of the mast will be carried upon the stub connected wheel, an arcuate shaped rack connected in the rear corner of the first-mentioned frame and extended about the mast, a lever extending outwardly from the mast into close proximity to the operator's station on a bicycle-like frame and adapted to be operated over the rack and retained by the rack in the adjusted position, a sail boom and a sail connected with the sail mast.

HAL W. LAND.

REFERENCES CITED

The following references are of record in the file of this patent:

UNITED STATES PATENTS

| Number | Name | Date |
|---|---|---|
| 257,415 | Unzicker | May 2, 1882 |
| 639,107 | Sorensen | Dec. 12, 1899 |
| 980,092 | Gagnon | Dec. 27, 1910 |
| 1,159,340 | Flickinger | Nov. 2, 1915 |